United States Patent [19]

Kincaid

[11] 4,063,772

[45] Dec. 20, 1977

[54] TAILGATE VENT

[76] Inventor: Ray Charles Kincaid, 8715 Starcrest No. 53, San Antonio, Tex. 78217

[21] Appl. No.: 726,075

[22] Filed: Sept. 23, 1976

[51] Int. Cl.² .............................................. B62D 35/00
[52] U.S. Cl. ..................................... 296/1 S; 98/2.16; 105/2 R; 296/50; 296/91
[58] Field of Search ................. 296/50, 56, 57 R, 1 S, 296/91; 105/2 R; 98/2.16; 298/23 R, 23 S, 23 A, 23 B, 23 K, 23 D, 23 DF

[56] References Cited

U.S. PATENT DOCUMENTS 3,437,371 4/1969 Gallie ................................... 296/1 S

FOREIGN PATENT DOCUMENTS 2,149,034 4/1973 Germany ............................. 296/1 S Primary Examiner—Joseph F. Peters, Jr.
Assistant Examiner—John A. Carroll
Attorney, Agent, or Firm—Fulbright & Jaworski

[57] ABSTRACT

A tailgate vent and deflector for use with a vehicle having an open top carrying compartment for allowing the passage of air through and around the tailgate when the compartment is empty thereby relieving the force of the wind on the tailgate as the vehicle moves along the road, but preventing the passage of material from the compartment. The tailgate includes at least one opening and a material shield is positioned in the compartment extending downwardly from above the opening to adjacent the bottom of the opening for preventing material in the compartment from moving through the opening and the shield forms an air passage between the opening and the compartment for allowing the passage of air through the tailgate from the compartment as well as deflecting a portion of the air out of the compartment. Preferably, the bottom of the opening is positioned above the bottom of the compartment and the material shield is connected to the inside of the tailgate and extends downwardly below the bottom of the opening but above the bottom of the compartment.

6 Claims, 3 Drawing Figures

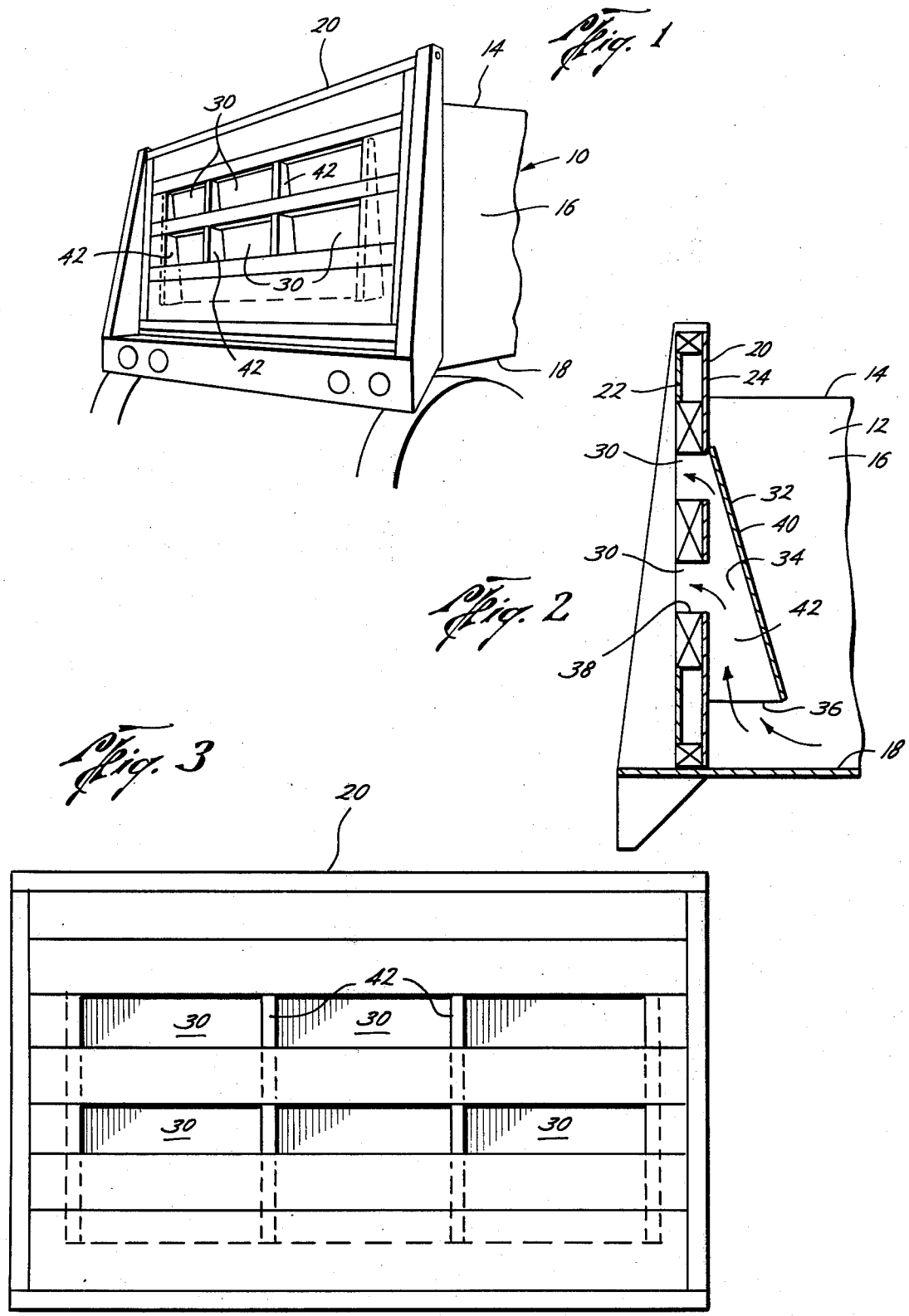

TAILGATE VENT

BACKGROUND OF THE INVENTION

As a vehicle, such as a truck or a trailer, having an open top load carrying compartment moves along the road, wind enters the compartment and acts against the front of the tailgate to create a drag on the vehicle which increases the fuel consumption used to move the vehicle along the road.

The present invention is directed to providing vent and deflector means in the tailgate which allows the passage of air through the tailgate for relieving the force of the wind acting against the front of the tailgate as the vehicle moves along the road thereby reducing the fuel consumption required to move the vehicle. However, the vent means prevents the passage of meterial carried in the load carrying compartment from moving through and falling out of the opening.

SUMMARY

The present invention is directed to an improvement in a vehicle having an open top load carrying compartment and a tailgate in which air vent means is provided in the tailgate allowing the passage of air through the tailgate when the compartment is empty, but preventing the passage of material from the load carrying compartment.

Another object of the present invention is the provision of at least one opening in the tailgate and a material shield positioned in the compartment extending downwardly from above the opening to adjacent the bottom of the opening for preventing material in the compartment from moving through the opening. The shield forms an air passageway between the opening in the compartment for allowing the passage of air through the tailgate from the compartment thereby relieving air pressure on the front of the tailgate as the empty vehicle moves along the road.

Another object of the present invention is the provision of an opening in the tailgate of a vehicle in which the bottom of the opening is positioned above the bottom of the load carrying compartment of the vehicle. Preferably, the material shield is connected to the inside of the tailgate above the opening and is directed downwardly and away from the tailgate to deflect a portion of the wind out of the compartment, preferably the bottom of the shield extends downwardly below the bottom of the opening but above the bottom of the compartment for preventing loaded material in the compartment from moving through the opening.

Another object of the present invention is the provision of vent means in the tailgate of a vehicle which requires no moving parts and which requires a minimum of space.

Other and further objects, features and advantages will be apparent from the following description of a presently preferred embodiment of the invention, given for the purpose of disclosure, and taken in conjunction with the accompanying drawings.

BRIEF DESCRIPTION OF THE DRAWINGS

FIG. 1 is a perspective elevational view of the invention on the tailgate of a vehicle, FIG. 2 is an enlarged cross-sectional view through the tailgate of the vehicle of FIG. 1, and FIG. 3 is an enlarged elevational view of the tailgate.

DESCRIPTION OF THE PREFERRED EMBODIMENT

Referring to the drawings, and particularly to FIG. 1, the reference numeral 10 generally indicates a vehicle, which may be a trailer or a truck, such as a dumptruck having a load carrying compartment 12 which includes an open top 14, sides 16, and a bottom 18 for suitably carrying various types of meterial loads. The compartment 12 further includes a tailgate 20.

The tailgate 20 has a back side 22 and a forward side 24. When the empty vehicle 10 moves along a road the wind enters into the empty compartment 12 and engages the front side 24 of the tailgate 20 creating a force which retards the forward movement of the vehicle 10 thereby increasing the fuel consumption required to move the vehicle 10 along the road.

The present invention is directed to providing vent means allowing passage of air through the tailgate when the vehicle compartment is empty thereby reducing the air pressure and force of the wind against the tailgate but without interfering with the load carrying operation of the vehicle 10. Thus, at least one opening, and here shown as a plurality of openings 30 are provided in the tailgate 20, which, while allowing the exit of air through the tailgate, does not weaken the structural strength of the tailgate 20. A material shield 32 is positioned in the compartment 16 and extends downwardly from above the openings 30 sufficiently, such as adjacent the bottom of the openings 30, for preventing material in the compartment 12 from moving through the openings 30. The shield 32 forms an air passage 34 between the openings 30 and the compartment 12 for allowing the passage of air from the compartment 12 through the tailgate to reduce the air pressure on the front side 24 of the tailgate 20.

In order to more fully prevent the passage of the loaded material from the compartment 12 out of the openings 30, it is preferable that the openings 30 be spaced above the bottom 18 of the compartment 12, and that the bottom 36 of the shield 32 extends downwardly below the bottom of the openings 30. Therefore, the material in the compartment 16 will not readily travel under the lower end 36 of the shield 32 and upwardly through the air passage 34 to reach the openings 30. Of course, the particular size, shape and spacing of the barrier 32 relative to the openings 30 required to preclude passage of material from the compartment 12 through the openings 30 would depend to some extent upon the type of material load carried by the compartment 16.

Preferably, the bottom 36 of th shield 32 is positioned above the bottom of the compartment 18 to reduce as much of the air pressure as possible, to avoid taking up any more of the compartment space 16 than is necessary, and to prevent the blockage of the air space 34 by material becoming stuck in the pasageway 34.

The material shield 32 may be connected to and supported from the tailgate 30 and is directed downwardly and away from the tailgate whereby the front side 40 of the barrier 32 also has the effect of deflecting air upwardly and over tailgate 20 to reduce the drag effect of the wind. For structural support, the shield 32 may include a plurality of supports 42 supporting the shield from the tailgate 20.

It is to be noted that the vent means of the present invention does not interfere with the operation of the tailgate, requires no moving parts for the vehicle operator to actuate, takes up a minimum extra space, but yet reduces the air pressure asserted by the wind on the front of the tailgate 20 by deflecting a portion of the air from the side 40 of the shield 32 and by allowing the air in the loading compartment 16 to pass through the passageway 34 and out through the openings 30 of the tailgate 20.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts will readily suggest themselves to those skilled in the art and which are encompassed within the spirit of the invention and the scope of the appended claims.

What is claimed is:

1. In combination with a vehicle having an open top load carrying compartment having a tailgate, vent means allowing the passage of air through the tailgate when the compartment is empty, but preventing the passage of material from the compartment comprising,
    at least one opening in the tailgate,
    a material shield positioned in the bottom of the compartment extending downwardly from above the opening to adjacent the bottom of the opening for preventing material in the compartment from moving through the opening, and
    said shield forming an air passageway between the opening and the compartment for allowing the passage of air through the tailgate from the compartment.

2. The apparatus of claim 1 wherein the bottom of the opening is spaced above the bottom of the compartment.

3. The apparatus of claim 2 wherein the bottom of the shield is above the bottom of the compartment.

4. The apparatus of claim 3 wherein the shield is supported from the tailgate.

5. The apparatus of claim 4 wherein the sheild extends downwardly and away from the tailgate.

6. A tailgate for use with a vehicle having an open top load carrying compartment comprising,
    a tailgate body,
    at least one opening in the body, the bottom of said opening being positioned above the bottom of the compartment,
    a material shield connected to the inside of the tailgate above the opening and directed downwardly and away from the tailgate, the bottom of the shield extending downwardly below the bottom of the opening but above the bottom of the compartment for preventing material in the compartment from moving through the opening,
    said shield forming an air passageway between the opening and the compartment for allowing the passage of air through the tailgate from the compartment.

* * * * *

UNITED STATES PATENT OFFICE
CERTIFICATE OF CORRECTION

Patent No. 4,063,772  Dated December 20, 1977

Inventor(s) Ray Charles Kincaid

It is certified that error appears in the above-identified patent and that said Letters Patent are hereby corrected as shown below:

Column 2, line 9, change "meterial" to --material--

Column 2, line 52, change "th" to --the--

Column 2, line 57, change "pasageway" to --passageway--

Column 3, line 24, delete "bottom of the"

Signed and Sealed this

Ninth Day of May 1978

[SEAL]

Attest:

RUTH C. MASON
Attesting Officer

LUTRELLE F. PARKER
Acting Commissioner of Patents and Trademarks